US012755462B2

(12) United States Patent
Kang et al.

(10) Patent No.: US 12,755,462 B2
(45) Date of Patent: Oct. 6, 2026

(54) DEEP LEARNING BASED ACCELERATED MRI RECONSTRUCTION USING MIXED CNN AND VISION TRANSFORMER

(71) Applicant: The Chinese University of Hong Kong, Shatin (CN)

(72) Inventors: Hongjian Kang, Tai Po (CN); Weitian Chen, Ma On Shan (CN)

(73) Assignee: The Chinese University of Hong Kong, Shatin (CN)

( * ) Notice: Subject to any disclaimer, the term of this patent is extended or adjusted under 35 U.S.C. 154(b) by 259 days.

(21) Appl. No.: 18/628,342

(22) Filed: Apr. 5, 2024

(65) Prior Publication Data

US 2024/0355011 A1 Oct. 24, 2024

Related U.S. Application Data

(60) Provisional application No. 63/460,268, filed on Apr. 18, 2023.

(51) Int. Cl.

| | |
|---|---|
| ***G06T 12/10*** | (2026.01) |
| ***G06T 5/10*** | (2006.01) |
| ***G06T 7/11*** | (2017.01) |
| ***G06V 10/44*** | (2022.01) |
| ***G06V 10/80*** | (2022.01) |

(52) U.S. Cl.

CPC ................ *G06T 12/10* (2026.01); *G06T 5/10* (2013.01); *G06T 7/11* (2017.01); *G06V 10/44* (2022.01); *G06V 10/806* (2022.01); *G06T 2207/10088* (2013.01); *G06T 2207/20084* (2013.01)

(58) Field of Classification Search

None

See application file for complete search history.

(56) References Cited

U.S. PATENT DOCUMENTS

| | | | | |
|---|---|---|---|---|
| 10,712,416 | B1 * | 7/2020 | Sandino | G01R 33/5608 |
| 2022/0299588 | A1 * | 9/2022 | Zhu | G01R 33/5611 |
| 2022/0375141 | A1 * | 11/2022 | Sandino | A61B 5/0515 |
| 2023/0122658 | A1 * | 4/2023 | Kamilov | G01R 33/5611 382/131 |

(Continued)

OTHER PUBLICATIONS

Pal, et al., "A review and experimental evaluation of deep learning methods for MRI reconstruction," J Mach Learn Biomed Imaging; 1:001. (2022).

(Continued)

*Primary Examiner* — Sj Park

(74) *Attorney, Agent, or Firm* — Kilpatrick Townsend & Stockton LLP

(57) ABSTRACT

Described herein are systems, methods, and other techniques for operating and training a dual-branch image reconstruction network having a transformer branch and a CNN branch. A zero-filled image is provided to the network, the zero-filled image having been generated using zero-filled k-space data. A set of CNN output features are generated using the CNN branch based on the zero-filled image. The zero-filled image is partitioned to form a partitioned image. A set of transformer output features are generating using the transformer branch based on the partitioned image. The set of transformer output features are fused with the set of CNN features to form a fused output. A reconstructed image is generated from the fused output.

20 Claims, 7 Drawing Sheets

(56) References Cited

U.S. PATENT DOCUMENTS

2024/0290011 A1* 8/2024 Zhou .................. G01R 33/5608

OTHER PUBLICATIONS

Zhu, et al., "Image reconstruction by domain-transform manifold learning," Nature; 555(7697):487-492. (2018).
Eo, et al., "KIKI-net: cross-domain convolutional neural networks for reconstructing undersampled magnetic resonance images," Magn Reson Med; 80(5):2188-2201 (2018).
Huang, et al., "Swin transformer for fast MRI," Neurocomputing; 493: 281-304 (2022).
Zhou, et al., "A dual-domain self-supervised transformer for accelerated multi-contrast mri reconstruction," arXiv preprint arXiv:2201.10776, (2022).
Knoll, et al., "fastMRI: A Publicly Available Raw k-Space and DICOM Dataset of Knee Images for Accelerated MR Image Reconstruction Using Machine Learning," Radiol Artif Intell; 2(1):e190007 (2020).
Lustig, et al., "Compressed sensing MRI," IEEE signal processing magazine; 25(2): 72-82 (2008).
Ronneberger, "U-net: Convolutional networks for biomedical image segmentation," International Conference on Medical image computing and computer-assisted intervention. Springer, Cham; 234-241 (2015).
Liang, et al., "Swinir: Image restoration using swin transformer, "Proceedings of the IEEE/CVF International Conference on Computer Vision; 1833-1844 (2021).

* cited by examiner

DEEP LEARNING BASED ACCELERATED MRI RECONSTRUCTION USING MIXED CNN AND VISION TRANSFORMER

CROSS-REFERENCES TO RELATED APPLICATIONS

This application claims the benefit of priority to U.S. Provisional Patent Application No. 63/460,268, filed Apr. 18, 2023, entitled "DEEP LEARNING BASED ACCELERATED MRI RECONSTRUCTION USING MIXED CNN AND VISION TRANSFORMER," the entire content of which is incorporated herein by reference for all purposes.

BACKGROUND OF THE INVENTION

Magnetic Resonance Imaging (MRI) is a widely used medical imaging technique that produces detailed images of the inside of the human body. MRI works by generating a strong magnetic field around the body, which causes the protons in the body's water molecules to align with the magnetic field. The MRI machine then emits radiofrequency pulses that cause these protons to flip, emitting signals that are detected by the machine and used to generate images of the body. However, the raw signals obtained from an MRI scan are not directly interpretable, and must be reconstructed into an image through an MRI reconstruction process.

MRI reconstruction is an important step in the MRI imaging process, as it plays a key role in determining the quality of the final image. Reconstruction algorithms can use mathematical techniques to transform the raw MRI signals into a digital image that can be viewed and analyzed by medical professionals. The process of MRI reconstruction can be computationally intensive, and can involve a range of techniques such as filtering, Fourier transform, and interpolation. Improving the accuracy and speed of MRI reconstruction is an ongoing area of research in the field of medical imaging, with the goal of producing higher quality images and reducing the time and cost associated with MRI scans.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method comprising: providing a zero-filled image to a dual-branch image reconstruction network having a transformer branch and a convolutional neural network (CNN) branch, the zero-filled image having been generated using zero-filled k-space data; generating, using the CNN branch and based on the zero-filled image, a set of CNN output features; partitioning the zero-filled image to form a partitioned image; generating, using the transformer branch and based on the partitioned image, a set of transformer output features; fusing the set of transformer output features with the set of CNN features to form a fused output; and generating a reconstructed image from the fused output.

Example 2 is the method of example(s) 1, wherein generating the reconstructed image from the fused output includes: performing one or more convolution operations on the fused output to generate the reconstructed image.

Example 3 is the method of example(s) 1-2, wherein the partitioned image includes a set of patches, and wherein the set of patches are non-overlapping.

Example 4 is the method of example(s) 3, wherein the transformer branch includes an embedding layer that produces an embedding for each patch of the set of patches in the partitioned image.

Example 5 is the method of example(s) 1-4, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

Example 6 is the method of example(s) 1-5, further comprising: measuring k-space data at a magnetic resonance imaging (MRI) machine; and zero filling the k-space data to increase a number of data points for the k-space data.

Example 7 is the method of example(s) 6, further comprising: performing an inverse Fourier transform on the zero-filled k-space data to generate the zero-filled image.

Example 8 is a non-transitory computer-readable medium comprising instructions that, when executed by one or more processors, cause the one or more processors to perform operations comprising: providing a zero-filled image to a dual-branch image reconstruction network having a transformer branch and a convolutional neural network (CNN) branch, the zero-filled image having been generated using zero-filled k-space data; generating, using the CNN branch and based on the zero-filled image, a set of CNN output features; partitioning the zero-filled image to form a partitioned image; generating, using the transformer branch and based on the partitioned image, a set of transformer output features; fusing the set of transformer output features with the set of CNN features to form a fused output; and generating a reconstructed image from the fused output.

Example 9 is the non-transitory computer-readable medium of example(s) 8, wherein generating the reconstructed image from the fused output includes: performing one or more convolution operations on the fused output to generate the reconstructed image.

Example 10 is the non-transitory computer-readable medium of example(s) 8-9, wherein the partitioned image includes a set of patches, and wherein the set of patches are non-overlapping.

Example 11 is the non-transitory computer-readable medium of example(s) 10, wherein the transformer branch includes an embedding layer that produces an embedding for each patch of the set of patches in the partitioned image.

Example 12 is the non-transitory computer-readable medium of example(s) 8-11, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

Example 13 is the non-transitory computer-readable medium of example(s) 8-12, wherein the operations further comprise: measuring k-space data at a magnetic resonance imaging (MRI) machine; and zero filling the k-space data to increase a number of data points for the k-space data.

Example 14 is the non-transitory computer-readable medium of example(s) 13, wherein the operations further comprise: performing an inverse Fourier transform on the zero-filled k-space data to generate the zero-filled image.

Example 15 is a system comprising: one or more processors; and a computer-readable medium comprising instructions that, when executed by the one or more processors, cause the one or more processors to perform operations comprising: providing a zero-filled image to a dual-branch image reconstruction network having a transformer branch and a convolutional neural network (CNN) branch, the zero-filled image having been generated using zero-filled k-space data; generating, using the CNN branch and based on the zero-filled image, a set of CNN output features; partitioning the zero-filled image to form a partitioned image; generating, using the transformer branch and based on the partitioned image, a set of transformer output features; fusing the set of transformer output features with the set of CNN features to form a fused output; and generating a reconstructed image from the fused output.

Example 16 is the system of example(s) 15, wherein generating the reconstructed image from the fused output includes: performing one or more convolution operations on the fused output to generate the reconstructed image.

Example 17 is the system of example(s) 15-16, wherein the partitioned image includes a set of patches, and wherein the set of patches are non-overlapping.

Example 18 is the system of example(s) 17, wherein the transformer branch includes an embedding layer that produces an embedding for each patch of the set of patches in the partitioned image.

Example 19 is the system of example(s) 15-18, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

Example 20 is the system of example(s) 15-19, wherein the operations further comprise: measuring k-space data at a magnetic resonance imaging (MRI) machine; and zero filling the k-space data to increase a number of data points for the k-space data.

Example 21 is the system of example(s) 20, wherein the operations further comprise: performing an inverse Fourier transform on the zero-filled k-space data to generate the zero-filled image.

Example 22 is a method of training a dual-branch image reconstruction network, the method comprising: measuring k-space data at a magnetic resonance imaging (MRI) machine; performing an inverse Fourier transform on the k-space data to generate a reference reconstructed image; replacing a number of data points in the k-space data with zeros to form zero-filled k-space data; performing an inverse Fourier transform on the zero-filled k-space data to generate a zero-filled image; providing the zero-filled image to the dual-branch image reconstruction network having a transformer branch and a convolutional neural network (CNN) branch, the zero-filled image having been generated using zero-filled k-space data; generating, using the CNN branch and based on the zero-filled image, a set of CNN output features; partitioning the zero-filled image to form a partitioned image; generating, using the transformer branch and based on the partitioned image, a set of transformer output features; fusing the set of transformer output features with the set of CNN features to form a fused output; generating a reconstructed image from the fused output; and modifying weights associated with the dual-branch image reconstruction network based on a comparison between the reconstructed image and the reference reconstructed image.

Example 23 is the method of example(s) 22, wherein generating the reconstructed image from the fused output includes: performing one or more convolution operations on the fused output to generate the reconstructed image.

Example 24 is the method of example(s) 22-23, wherein the partitioned image includes a set of patches, and wherein the set of patches are non-overlapping.

Example 25 is the method of example(s) 24, wherein the transformer branch includes an embedding layer that produces an embedding for each patch of the set of patches in the partitioned image.

Example 26 is the method of example(s) 22-25, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

Example 27 is the method of example(s) 22-26, further comprising: calculating a loss based on the comparison between the reconstructed image and the reference reconstructed image, wherein the weights associated with the dual-branch image reconstruction network are modified based on the loss.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
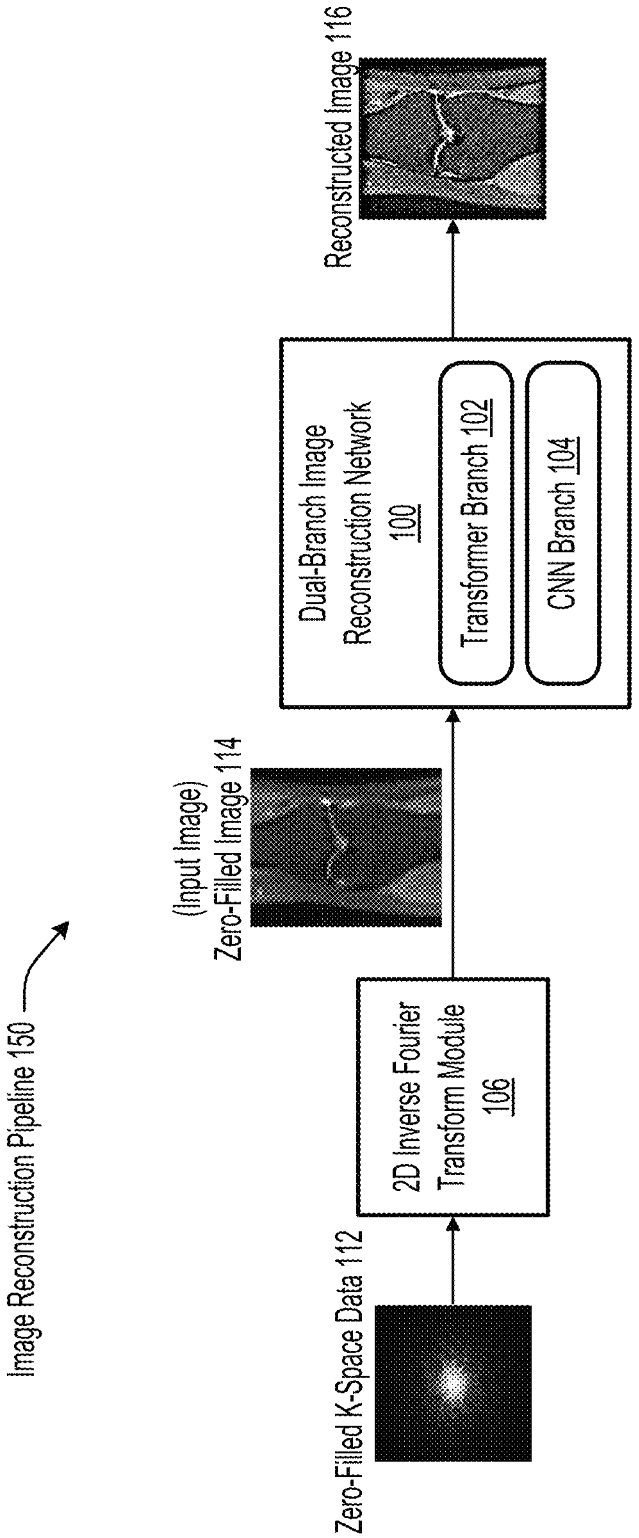
FIG. 1 illustrates an example of an image reconstruction pipeline.

Magnetic Resonance Imaging (MRI) is a non-invasive medical imaging modality that is particularly well-suited for imaging soft tissues in the body. In MRI imaging, k-space is a mathematical domain that is used to store the raw data obtained from the MRI scan. The data in k-space represents the spatial frequencies of the magnetic resonance signals that are detected by the MRI scanner. By performing a mathematical transformation called a Fourier transform on the data in k-space, an image can be constructed.

One drawback of MRI imaging is the image acquisition time. The traditional method for acquiring an MRI image involves filling the entire k-space, which can be time-consuming and may limit the number of images that can be acquired in a given period of time. One approach to reduce the time it takes to acquire an image is k-space under-sampling. By under-sampling in k-space, fewer data points are acquired, reducing the scan time. The missing data in k-space may be filled in with zeros to increase the number of data points in the k-space image. However, this results in an incomplete set of data and can lead to artifacts in the reconstructed image.

To address this issue, various reconstruction techniques have been developed, such as compressed sensing and parallel imaging, which allow for accurate image reconstruction from under-sampled k-space data. These techniques can use mathematical models to predict missing data points and fill in the gaps in the k-space data, resulting in better quality images with reduced scan time. K-space under-sampling is now a widely used technique in MRI imaging, as it enables faster scans, reduces patient discomfort, and increases the throughput of MRI machines.

Embodiments of the present disclosure address the MRI reconstruction problem by employing a machine-learning model consisting of a network with a dual-branch architecture to convert an image produced by a zero-filled k-space dataset into a reconstructed image with improved quality and accuracy. The proposed network includes a first branch, referred to as the convolutional neural network (CNN) branch, which includes multiple convolution operations, and a second branch, referred to as the transformer branch, with includes a vision transformer structure with cascaded self-attention modules. This architecture offers the benefits of both a CNN, which is good at extracting local features but may experience difficulty capturing global representations due to the limitation of its receptive field, as well as a vision transformer, whose cascaded self-attention modules can fuse global representations between the compressed patch embeddings. In the described network, the two branches are used to perform global and local modeling simultaneously for accelerated MRI reconstruction.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of an image reconstruction pipeline 150, in accordance with some embodiments of the present disclosure. In some examples, zero-filled k-space data 112 is provided as input to image reconstruction pipeline 150. Zero-filled k-space data 112 may include a include a set of k-space data where the position and orientation of each point in the data are represented as a set of complex numbers. For example, during an MRI scan, a series of radiofrequency pulses are applied to the body, which cause the protons in the body's water molecules to emit signals that are detected by the MRI scanner. These signals are digitized and stored as complex numbers in k-space. Each point in k-space corresponds to a specific spatial frequency, with high spatial frequencies representing fine details in the image and low spatial frequencies representing coarse features. In some cases, zero-filled k-space data 112 may be formed from under-sampled k-space data having missing data points filled in with zeros, such that the number of data points in k-space is increased.

In some examples, zero-filled k-space data 112 is provided as an input to a 2D inverse Fourier transform module 106, which performs a 2D inverse Fourier transform (IFT) on zero-filled k-space data 112 to transform the k-space data into a zero-filled image 114. The 2D IFT is a mathematical operation that converts the complex data in k-space into the image domain, where the image can be visualized. In some instances, the IFT is applied separately to each pixel in the image, using a mathematical formula that calculates the pixel intensity based on the complex values of the corresponding data point in k-space. The result of the IFT may be center cropped to remove any readout and phase oversampling. In one example, zero-filled image 114 has a size of 320×320 and a single channel (i.e., 320×320×1).

In some examples, zero-filled image 114 is provided as an input to a dual-branch image reconstruction network 100, which generates a reconstructed image 116 based on zero-filled image 114. Dual-branch image reconstruction network 100 may include a transformer branch 102 and a CNN branch 104, which are described in greater detail in FIG. 2. Branches 102 and 104 may operate simultaneously on zero-filled image 114, and the outputs generated by the branches may be combined to form reconstructed image 116.

Figure 2:
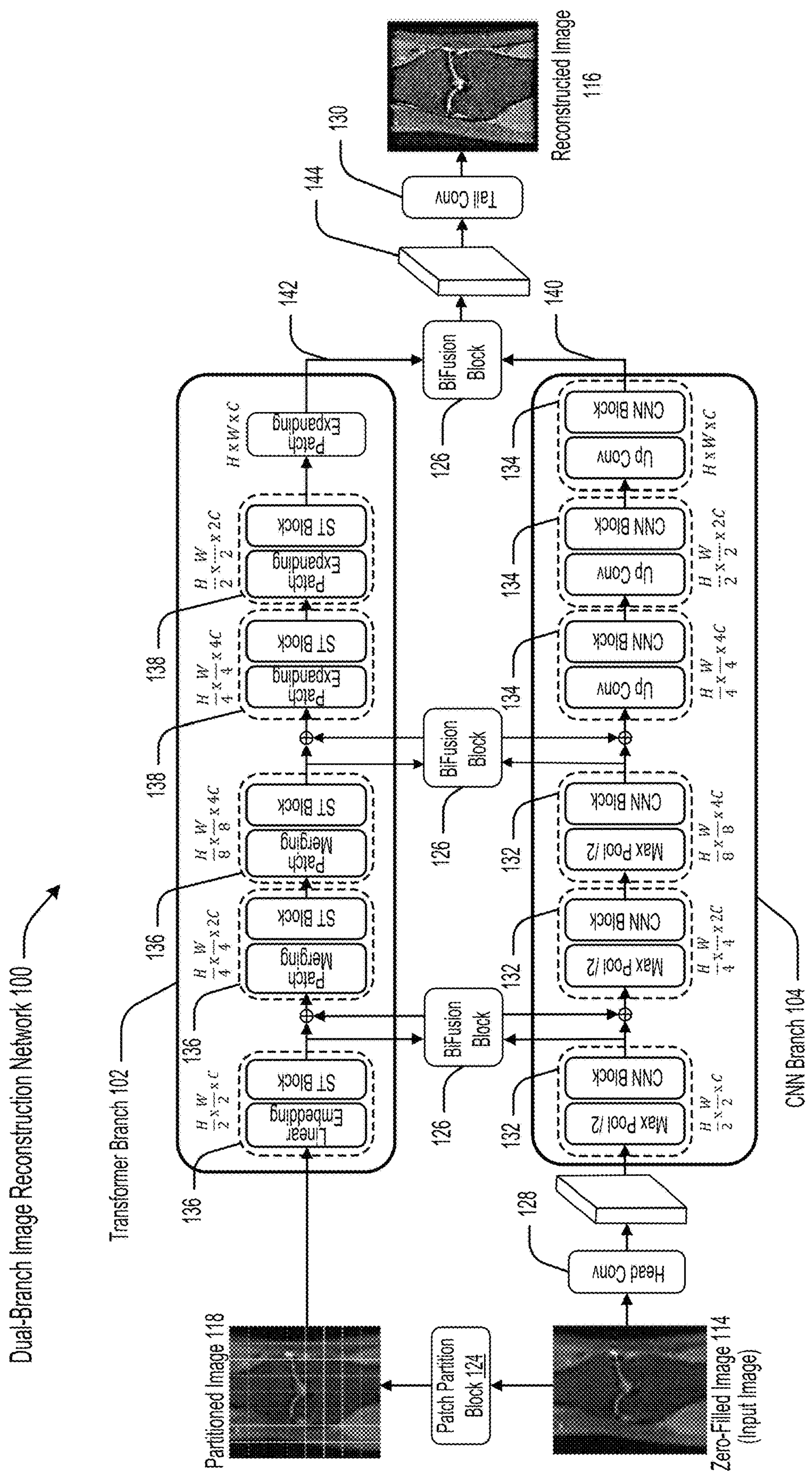
FIG. 2 illustrates an example architecture of a dual-branch image reconstruction network.

FIG. 2 illustrates an example architecture of dual-branch image reconstruction network 100 (or simply "network 100"), in accordance with some embodiments of the present disclosure. As shown in FIG. 2, network 100 consists of two parallel branches, transformer branch 102 and CNN branch 104. In some examples, before passing zero-filled image 114 to CNN branch 104, it may first be passed to a head convolution block 128, which may include one or more convolutional layers or pooling layers to initially process the input data. In one example, head convolution block 128 includes two convolutional layers, each with (' convolution kernels, with each kernel size 3×3 and stride length 2×2. In some examples, before passing zero-filled image 114 to transformer branch 102, it may first be passed to patch partition block 124, which generates a partitioned version of zero-filled image 114 in the form of partitioned image 118. Patch partition block 124 may utilize window partitioning starting from the top-left pixel of zero-filled image 114 and, in one particular example, partitioning the 320×320 sized image into 8×8 patches each of size 40×40. As such, in some examples, the patches of partitioned image 118 may be non-overlapping.

In some examples, CNN branch 104 gradually increases the receptive field and encodes features from local to global through the use of pooling operations ("Max Pool"), convolution operations ("CNN Block"), and upsampling convolution operations ("Up Conv") contained in multiple encoding blocks 132 and decoding blocks 134. In the illustrated example, each encoding block 132 includes a max-pooling block that is used to perform 2×2 max pooling for down-sampling the feature maps followed by a CNN block that is used to perform two repeated 3×3 convolutions, each followed by a Rectified Linear Unit (RELU) layer and a Batch Norm (BN) layer. Each decoding block 134 includes an up convolution block and a CNN block. The up convolution block is used to perform a convolution operation to the feature maps, followed by an upsampling operation that increases the spatial dimensions of the feature maps. The upsampling operation can be performed using different techniques, such as nearest-neighbor interpolation or bilinear interpolation.

In some examples, transformer branch 102 includes multiple encoding blocks 136 and decoding blocks 138 and operates by starting with global self-attention and thereafter recovers the local details. The patches of partitioned image 118 may be provided as input to a first one of encoding blocks 136 that includes a linear embedding layer that projects the raw-valued features to an arbitrary dimension (denoted as C), as well as a Swin Transformer (ST) block that consists of a shifted window-based multi-head self-attention (MSA) module, followed by a 2-layer multi-layer perceptron (MLP) with gaussian error linear units (GELU) in between. In some examples, a LayerNorm (LN) layer is applied before each MSA module and each MLP. Second and third encoding blocks 136 each include a patch merging block for down-sampling in a patch-wise operation following by an ST block. Each decoding block 138 includes a patch expanding block for up-sampling in a patch-wise operation followed by an ST block.

Shallow, mid, and deep features with the same resolution are extracted from both branches 102 and 104 and are fed into biFusion blocks 126 to adaptively fuse the information. For example, biFusion blocks 126 may be used for aggregating (e.g., concatenating, summing, etc.) the extracted features from branches 102 and 104 at different feature levels (shallow/middle/deep) with self-attention and multi-modal fusion mechanisms. These aggregated features may be fed back into both branches at the same feature level. The outputs of transformer branch 102 and CNN branch 104 include, respectively, a set of transformer output features 142 and a set of CNN output features 140. Output features 140 and 142 are fused at a final one of biFusion blocks 126 to form a fused output 144. For example, the final biFusion block 126 may fuse the outputs of the two branches by performing a concatenation operation along the channel dimension. This generates H×W×2C sized feature maps, which are then fed into a tail convolution block 130. Tail convolution block 130 may include one or more convolutional layers that are utilized to generate reconstructed image 116 from fused output 144 by performing one or more convolution operations on fused output 144. Reconstructed image 116 may be generated as a H×W×1 sized feature map by having the last convolution layer in tail convolution block 130 include only a single convolution kernel.

Network 100 may be trained through an iterative training process where, during each training iteration of multiple training iterations, a reference reconstructed image is compared to reconstructed image 116 to calculate a loss. Thereafter, weights associated with network 100 (e.g., weights associated with transformer branch 102 and/or weights associated with CNN branch 104) are modified based on the loss (e.g., via backpropagation). The weights may be adjusted in a manner so as to decrease the loss during subsequent iterations, i.e., so that reconstrued image 116 more accurately predicts the reference reconstructed image.

In some examples, to obtain the reference reconstructed image, fully sampled multi-coil k-space data may be measured at an MRI machine, and the inverse Fourier transform may be performed followed by the root-sum-of-squares reconstruction method. To obtain the zero-filled k-space data, the fully sampled multi-coil k-space data may be converted into virtual single-coil k-space data, and data points from the virtual single-coil k-space data can be replaced with zeros to produce zero-filled virtual single-coil k-space data. The inverse Fourier transform is used on the zero-filled virtual single-coil k-space data to generate the zero-filled k-space data, which is used as the input image during training. Similar to the input zero-filled images, all reference images may be cropped to the central 320×320 pixel region. The Mean Squared Error (MSE) loss used for training is formulated as Equation 1:

$$\mathcal{L}_{MSE} = \frac{1}{N}\sum_{i=1}^{N}(x_i - y_i)^2 \tag{1}$$

where $x_i$ and $y_i$ indicate the $i_{th}$ pixel of the reconstructed image and the reference reconstructed image, respectively. In some examples, both branches are trained simultaneously for a given pair of reconstructed image and reference reconstructed image.

Figure 3:
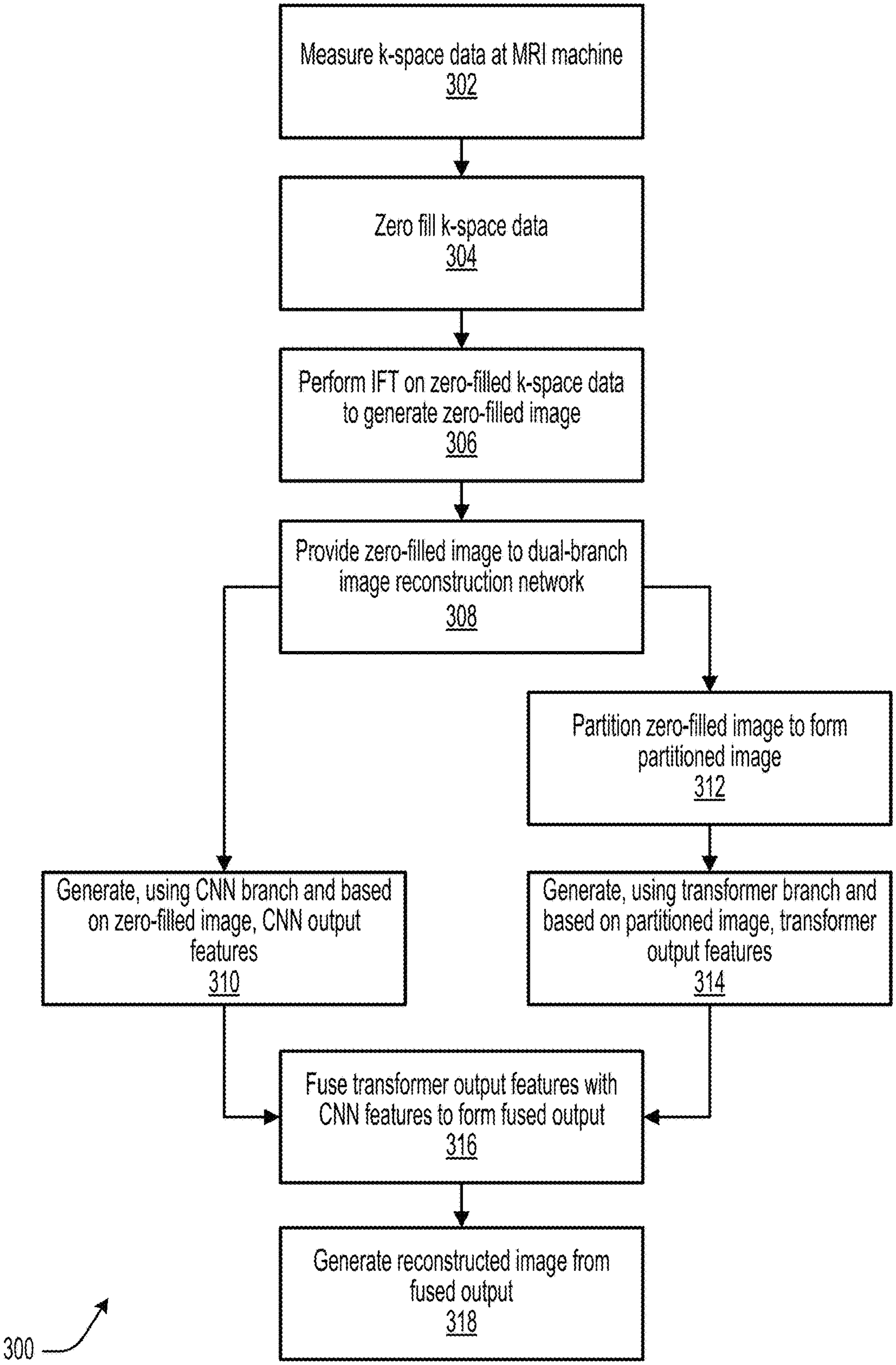
FIG. 3 illustrates an example method of generating a reconstructed image using a dual-branch image reconstruction network.

FIG. 3 illustrates a method 300 of generating a reconstructed image using a dual-branch image reconstruction network, in accordance with some embodiments of the present disclosure. Steps of method 300 may be performed in any order and/or in parallel, and one or more steps of method 300 may be optionally performed. One or more steps of method 300 may be performed by one or more processors, such as a neural network accelerator or a graphics processing unit. Method 300 may be implemented as a computer-readable medium or computer program product comprising instructions which, when the program is executed by one or more processors, cause the one or more processors to carry out the steps of method 300.

At step 302, k-space data is measured at an MRI machine. The k-space data may be under sampled.

At step 304, the k-space data is zero filled to increase a number of data points in the k-space data. The result of zero filling the k-space data is referred to as zero-filled k-space data (e.g., zero-filled k-space data 112).

At step 306, an inverse Fourier transform is performed on the zero-filled k-space data to generate a zero-filled image (e.g., zero-filled image 114).

At step 308, the zero-filled image is provided as input to a dual-branch image reconstruction network (e.g., dual-branch image reconstruction network 100) having a transformer branch (e.g., transformer branch 102) and a CNN branch (e.g., CNN branch 104).

At step 310, a set of CNN output features (e.g., CNN output features 140) are generated using the CNN branch based on the zero-filled image.

At step 312, the zero-filled image is partitioned to form a partitioned image (e.g., partitioned image 118).

At step 314, a set of transformer output features (e.g., transformer output features 142) are generated using the transformer branch based on the partitioned image. In some examples, steps 312 and 314 are performed concurrently or simultaneously.

At step 316, the set of transformer output features are fused with the set of CNN features to form a fused output (e.g., fused output 144).

At step 318, a reconstructed image (e.g., reconstructed image 116) is generated from the fused output.

Figure 4:
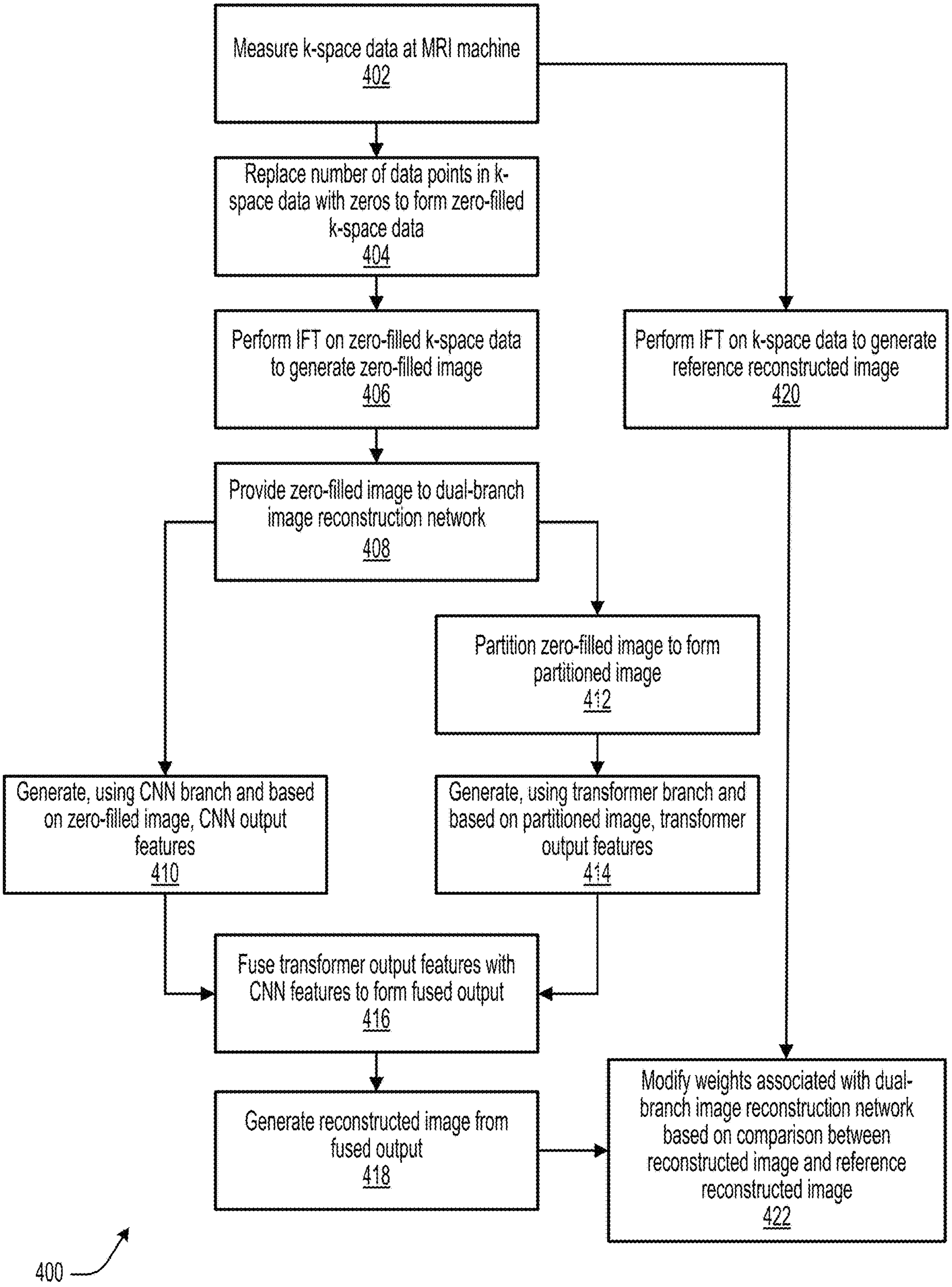
FIG. 4 illustrates an example method of training a dual-branch image reconstruction network to generate a reconstructed image.

FIG. 4 illustrates a method 400 of training a dual-branch image reconstruction network to generate a reconstructed image, in accordance with some embodiments of the present disclosure. Steps of method 400 may be performed in any order and/or in parallel, and one or more steps of method 400 may be optionally performed. One or more steps of method 400 may be performed by one or more processors, such as a neural network accelerator or a graphics processing unit. Method 400 may be implemented as a computer-readable medium or computer program product comprising instructions which, when the program is executed by one or more processors, cause the one or more processors to carry out the steps of method 400.

At step 402, k-space data is measured at an MRI machine. The k-space data may be fully sampled.

At step 404, a number of data points in the k-space data are replaced with zeros, resulting in zero-filled k-space data (e.g., zero-filled k-space data 112).

At step 406, an inverse Fourier transform is performed on the zero-filled k-space data to generate a zero-filled image (e.g., zero-filled image 114).

At step 408, the zero-filled image is provided as input to a dual-branch image reconstruction network (e.g., dual-branch image reconstruction network 100) having a transformer branch (e.g., transformer branch 102) and a CNN branch (e.g., CNN branch 104).

At step 410, a set of CNN output features (e.g., CNN output features 140) are generated using the CNN branch based on the zero-filled image.

At step 412, the zero-filled image is partitioned to form a partitioned image (e.g., partitioned image 118).

At step 414, a set of transformer output features (e.g., transformer output features 142) are generated using the transformer branch based on the partitioned image. In some examples, steps 412 and 414 are performed concurrently or simultaneously.

At step 416, the set of transformer output features are fused with the set of CNN features to form a fused output (e.g., fused output 142).

At step 418, a reconstructed image (e.g., reconstructed image 116) is generated from the fused output.

At step 420 (and optionally prior to replacing the data points in the k-space data with zeros at step 404), an inverse Fourier transform is performed on the k-space data to generate a reference reconstructed image.

At step 422, weights associated with the dual-branch image reconstruction network are modified/adjusted based on a comparison between the reconstructed image and the reference reconstructed image. In some examples, steps 402 to 422 are repeated for each training iteration of multiple training iterations. During each training iteration, weights associated with the transformer layer and weights associated with the CNN layer may be trained/adjusted.

Figure 5:
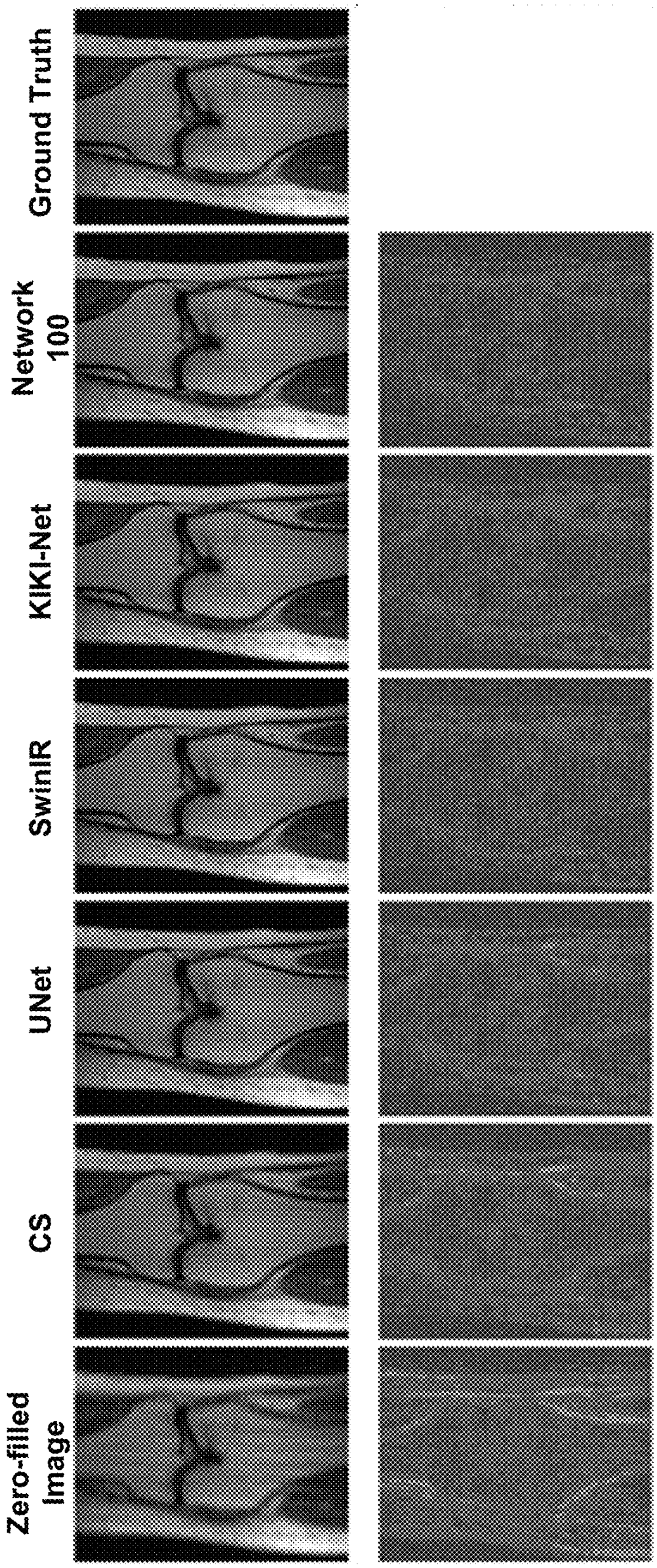
FIG. 5 illustrates reconstruction results for various methods.

FIG. 5 illustrates reconstruction results for the present method compared to conventional methods. The first column of the top row shows a zero-filled image, the last column of the top row shows a ground truth image, and remaining columns of the top row show reconstructed images using various approaches, including using dual-branch image reconstruction network 100. The bottom row shows the corresponding error maps between top images and the ground truth reconstructed image. The results in FIG. 5 demonstrate the accuracy of network 100 compared to conventional methods.

The experimental results shown in FIG. 5 were achieved by evaluating on the fastMRI single-coil knee dataset, which contains 1172 complex-valued single-coil coronal proton density (PD)-weighted knee MRI volumes with a matrix size of 320×320. The dataset was partitioned into 973 volumes for training, and 199 volumes (fastMRI validation dataset) for testing, with each volume roughly consisting of 36 slices. In the experiments, the input zero-filled images for training and testing were generated by applying inverse Fourier transforms to the under-sampled k-space data using the Cartesian under-sampling function released with the fastMRI dataset, with the acceleration factor of 4 and 8, respectively. The MSE was used as the loss function in the training phase.

As shown in FIG. 5, network 100 was compared to 4 conventional methods, including the compressed sensing (CS) method, the CNN-based UNet, the vision transformer model SwinIR, and KIKI-Net. The quantitative results of the comparisons are shown in Table 1 below (evaluation results of reconstructed images for acceleration factors (AF) of 4 and 8 on the validation set). Compared with the other methods, network 100 achieves the highest SSIM and PSNR for both acceleration factors.

TABLE 1

| | SSIM | | PSNR | |
|---|---|---|---|---|
| Method | AF = 4 | AF = 8 | AF = 4 | AF = 8 |
| CS | 0.5744 | 0.4812 | 29.37 | 27.11 |
| UNet | 0.7165 | 0.6413 | 31.98 | 29.52 |
| SwinIR | 0.7207 | 0.6548 | 32.27 | 30.12 |
| KIKI-Net | 0.7178 | 0.6419 | 32.16 | 29.78 |
| Network 100 | 0.7374 | 0.6623 | 32.61 | 30.56 |

Figure 6A:
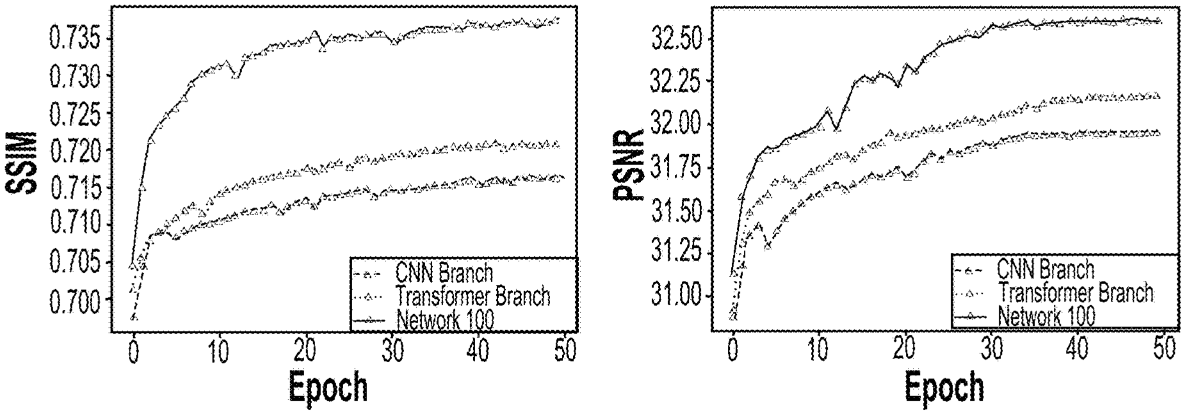
FIGS. 6A and 6B illustrate a comparison of three different approaches on a validation set.
Figure 6B:
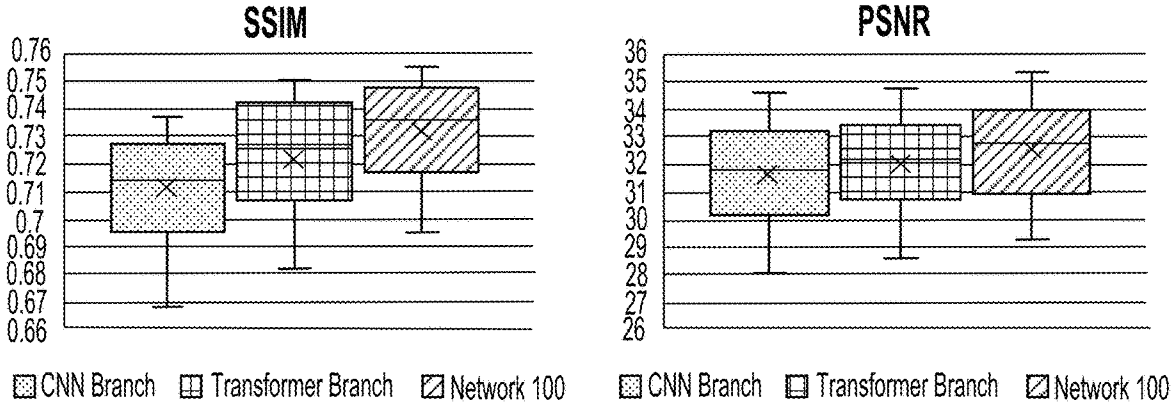

FIGS. 6A and 6B illustrate a comparison of three different approaches, including using only the CNN branch, only the transformer branch, and using dual-branch image reconstruction network 100 at 4× acceleration on a validation set. Peak signal-to-noise ratio (PSNR) and structural similarity index measure (SSIM) were used as evaluation metrics for comparison. FIG. 6A shows SSIM as a function of epoch, and FIG. 6B shows box-and-whisker plots for the corresponding data. Network 100 has the best performance on the validation set compared to the CNN branch or the transformer branch alone, demonstrating the benefits of the hybrid features provided by the proposed dual-branch architecture.

Figure 7:
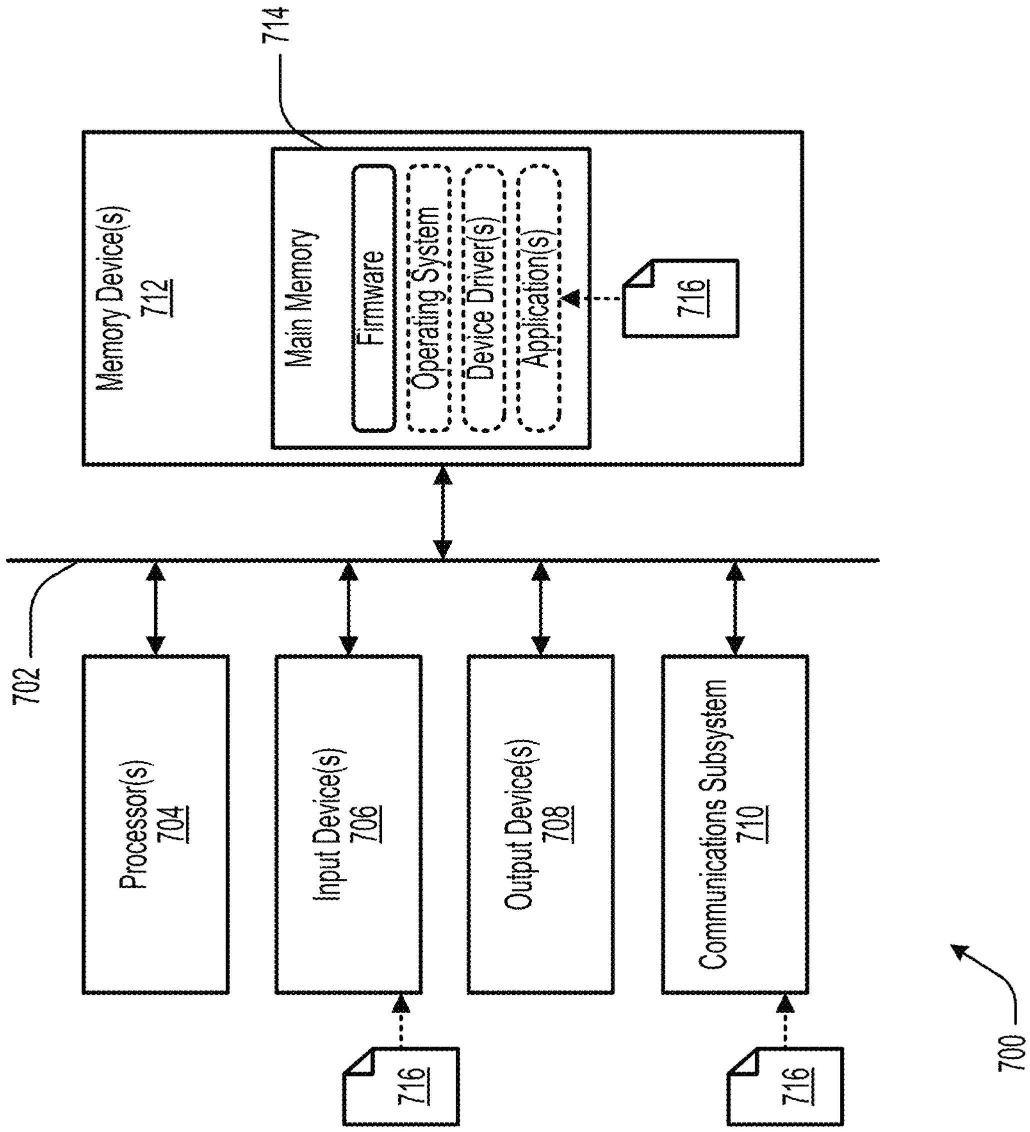
FIG. 7 illustrates an example computer system comprising various hardware elements.

FIG. 7 illustrates an example computer system 700 comprising various hardware elements, in accordance with some embodiments of the present disclosure. Computer system 700 may be incorporated into or integrated with devices described herein and/or may be configured to perform some or all of the steps of the methods provided by various embodiments. For example, in various embodiments, computer system 700 may be configured to perform methods 300 or 400. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, computer system 700 includes a communication medium 702, one or more processor(s) 704, one or more input device(s) 706, one or more output device(s) 708, a communications subsystem 710, and one or more memory device(s) 712. Computer system 700 may be implemented using various hardware implementations and embedded system technologies. For example, one or more elements of computer system 700 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 700 may be communicatively coupled via communication medium 702. While communication medium 702 is illustrated as a single connection for purposes of clarity, it should be understood that communication medium 702 may include various numbers and types of communication media for transferring data between hardware elements. For example, communication medium 702 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 702 may include one or more buses that connect the pins of the hardware elements of computer system 700. For example, communication medium 702 may include a bus that connects processor(s) 704 with main memory 714, referred to as a system bus, and a bus that connects main memory 714 with input device(s) 706 or output device(s) 708, referred to as an expansion bus. The system bus may itself consist of several buses, including an address bus, a data bus, and a control bus. The address bus may carry a memory address from processor(s) 704 to the address bus circuitry associated with main memory 714 in order for the data bus to access and carry the data contained at the memory address back to processor(s) 704. The control bus may carry commands from processor(s) 704 and return status signals from main memory 714. Each bus may include multiple wires for carrying multiple bits of information and each bus may support serial or parallel transmission of data.

Processor(s) 704 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide semiconductor field-effect transistor (MOSFET) construction. Processor(s) 704 may include one or more multi-core processors, in which each core may read and execute program instructions concurrently with the other cores, increasing speed for programs that support multithreading.

Input device(s) 706 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 706 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 708 may include one or more of various devices that convert information into human-readable form, such as without limitation a display device, a speaker, a printer, a haptic or tactile device, and/or the like. Output device(s) 708 may also include devices for writing to removable storage devices or other removable media, such as those described in reference to input device(s) 706. Output device(s) 708 may also include various actuators for causing physical movement of one or more components. Such actuators may be hydraulic, pneumatic, electric, and may be controlled using control signals generated by computer system 700.

Communications subsystem 710 may include hardware components for connecting computer system 700 to systems or devices that are located external to computer system 700, such as over a computer network. In various embodiments, communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 712 may include the various data storage devices of computer system 700. For example, memory device(s) 712 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 704 and memory device(s) 712 are illustrated as being separate elements, it should be understood that processor(s) 704 may include varying levels of on-processor memory, such as processor registers and caches that may be utilized by a single processor or shared between multiple processors.

Memory device(s) 712 may include main memory 714, which may be directly accessible by processor(s) 704 via the address and data buses of communication medium 702. For example, processor(s) 704 may continuously read and execute instructions stored in main memory 714. As such, various software elements may be loaded into main memory 714 to be read and executed by processor(s) 704 as illustrated in FIG. 7. Typically, main memory 714 is volatile memory, which loses all data when power is turned off and accordingly needs power to preserve stored data. Main memory 714 may further include a small portion of non-volatile memory containing software (e.g., firmware, such as BIOS) that is used for reading other software stored in memory device(s) 712 into main memory 714. In some embodiments, the volatile memory of main memory 714 is implemented as RAM, such as dynamic random-access memory (DRAM), and the non-volatile memory of main memory 714 is implemented as read-only memory (ROM), such as flash memory, erasable programmable read-only memory (EPROM), or electrically erasable programmable read-only memory (EEPROM).

Computer system 700 may include software elements, shown as being currently located within main memory 714, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 716, which are executable by computer system 700. In one example, such instructions 716 may be received by computer system 700 using communications subsystem 710 (e.g., via a wireless or wired signal that carries instructions 716), carried by communication medium 702 to memory device(s) 712, stored within memory device(s) 712, read into main memory 714, and executed by processor(s) 704 to perform one or more steps of the described methods. In another example, instructions 716 may be received by computer system 700 using input device(s) 706 (e.g., via a reader for removable media), carried by communication medium 702 to memory device(s) 712, stored within memory device(s) 712, read into main memory 714, and executed by processor(s) 704 to perform one or more steps of the described methods.

In some embodiments of the present disclosure, instructions 716 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 700. For example, the non-transitory computer-readable medium may be one of memory device(s) 712 (as shown in FIG. 7). In some cases, the non-transitory computer-readable medium may be separate from computer system 700. In one example, the non-transitory computer-readable medium may be a removable medium provided to input device(s) 706 (as shown in FIG. 7), such as those described in reference to input device(s) 706, with instructions 716 being read into computer system 700 by input device(s) 706. In another example, the non-transitory computer-readable medium may be a component of a remote electronic device, such as a mobile phone, that may wirelessly transmit a data signal that carries instructions 716 to computer system 700 and that is received by communications subsystem 710 (as shown in FIG. 7).

Instructions 716 may take any suitable form to be read and/or executed by computer system 700. For example, instructions 716 may be source code (written in a human-readable programming language such as Java, C, C++, C#, Python), object code, assembly language, machine code, microcode, executable code, and/or the like. In one example, instructions 716 are provided to computer system 700 in the form of source code, and a compiler is used to translate instructions 716 from source code to machine code, which may then be read into main memory 714 for execution by processor(s) 704. As another example, instructions 716 are provided to computer system 700 in the form of an executable file with machine code that may immediately be read into main memory 714 for execution by processor(s) 704. In various examples, instructions 716 may be provided to computer system 700 in encrypted or unencrypted form, compressed or uncompressed form, as an installation package or an initialization for a broader software deployment, among other possibilities.

In one aspect of the present disclosure, a system (e.g., computer system 700) is provided to perform methods in accordance with various embodiments of the present disclosure. For example, some embodiments may include a system comprising one or more processors (e.g., processor(s) 704) that are communicatively coupled to a non-transitory computer-readable medium (e.g., memory device(s) 712 or main memory 714). The non-transitory computer-readable medium may have instructions (e.g., instructions 716) stored therein that, when executed by the one or more processors, cause the one or more processors to perform the methods described in the various embodiments.

In another aspect of the present disclosure, a computer-program product that includes instructions (e.g., instructions 716) is provided to perform methods in accordance with various embodiments of the present disclosure. The computer-program product may be tangibly embodied in a non-transitory computer-readable medium (e.g., memory device(s) 712 or main memory 714). The instructions may be configured to cause one or more processors (e.g., processor(s) 704) to perform the methods described in the various embodiments.

In another aspect of the present disclosure, a non-transitory computer-readable medium (e.g., memory device(s) 712 or main memory 714) is provided. The non-transitory computer-readable medium may have instructions (e.g., instructions 716) stored therein that, when executed by one or more processors (e.g., processor(s) 704), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method comprising:
providing a zero-filled image to a dual-branch image reconstruction network having a transformer branch and a convolutional neural network (CNN) branch, the zero-filled image having been generated using zero-filled k-space data;
generating, using the CNN branch and based on the zero-filled image, a set of CNN output features;
partitioning the zero-filled image to form a partitioned image;
generating, using the transformer branch and based on the partitioned image, a set of transformer output features;
fusing the set of transformer output features with the set of CNN features to form a fused output; and
generating a reconstructed image from the fused output.

2. The method of claim 1, wherein generating the reconstructed image from the fused output includes:
performing one or more convolution operations on the fused output to generate the reconstructed image.

3. The method of claim 1, wherein the partitioned image includes a set of patches, and wherein the set of patches are non-overlapping.

4. The method of claim 3, wherein the transformer branch includes an embedding layer that produces an embedding for each patch of the set of patches in the partitioned image.

5. The method of claim 1, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

6. The method of claim 1, further comprising:
measuring k-space data at a magnetic resonance imaging (MRI) machine; and
zero filling the k-space data to increase a number of data points for the k-space data.

7. The method of claim 6, further comprising:
performing an inverse Fourier transform on the zero-filled k-space data to generate the zero-filled image.

8. A non-transitory computer-readable medium comprising instructions that, when executed by one or more processors, cause the one or more processors to perform operations comprising:
providing a zero-filled image to a dual-branch image reconstruction network having a transformer branch and a convolutional neural network (CNN) branch, the zero-filled image having been generated using zero-filled k-space data;
generating, using the CNN branch and based on the zero-filled image, a set of CNN output features;
partitioning the zero-filled image to form a partitioned image;
generating, using the transformer branch and based on the partitioned image, a set of transformer output features;
fusing the set of transformer output features with the set of CNN features to form a fused output; and
generating a reconstructed image from the fused output.

9. The non-transitory computer-readable medium of claim 8, wherein generating the reconstructed image from the fused output includes:
performing one or more convolution operations on the fused output to generate the reconstructed image.

10. The non-transitory computer-readable medium of claim 8, wherein the partitioned image includes a set of patches, and wherein the set of patches are non-overlapping.

11. The non-transitory computer-readable medium of claim 10, wherein the transformer branch includes an embedding layer that produces an embedding for each patch of the set of patches in the partitioned image.

12. The non-transitory computer-readable medium of claim 8, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

13. The non-transitory computer-readable medium of claim 8, wherein the operations further comprise:
measuring k-space data at a magnetic resonance imaging (MRI) machine; and
zero filling the k-space data to increase a number of data points for the k-space data.

14. The non-transitory computer-readable medium of claim 13, wherein the operations further comprise:
performing an inverse Fourier transform on the zero-filled k-space data to generate the zero-filled image.

15. A system comprising:
one or more processors; and
a computer-readable medium comprising instructions that, when executed by the one or more processors, cause the one or more processors to perform operations comprising:
providing a zero-filled image to a dual-branch image reconstruction network having a transformer branch and a convolutional neural network (CNN) branch, the zero-filled image having been generated using zero-filled k-space data;
generating, using the CNN branch and based on the zero-filled image, a set of CNN output features;
partitioning the zero-filled image to form a partitioned image;
generating, using the transformer branch and based on the partitioned image, a set of transformer output features;
fusing the set of transformer output features with the set of CNN features to form a fused output; and
generating a reconstructed image from the fused output.

16. The system of claim 15, wherein generating the reconstructed image from the fused output includes:
performing one or more convolution operations on the fused output to generate the reconstructed image.

17. The system of claim 15, wherein the partitioned image includes a set of patches, and wherein the set of patches are non-overlapping.

18. The system of claim 17, wherein the transformer branch includes an embedding layer that produces an embedding for each patch of the set of patches in the partitioned image.

19. The system of claim 15, wherein the dual-branch image reconstruction network includes a plurality of fusion blocks between the transformer branch and the CNN branch that aggregate extracted features from both the transformer branch and the CNN branch at different feature levels and pass the aggregated extracted features back to both the transformer branch and the CNN branch.

20. The system of claim 15, wherein the operations further comprise: measuring k-space data at a magnetic resonance imaging (MRI) machine; and zero filling the k-space data to increase a number of data points for the k-space data.

* * * * *